(12) United States Patent
Hatano

(10) Patent No.: US 7,401,633 B2
(45) Date of Patent: Jul. 22, 2008

(54) CAULKING DEVICE FOR METAL PLATE FOR TAPE REEL

(75) Inventor: Yasushi Hatano, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 423 days.

(21) Appl. No.: 11/136,561

(22) Filed: May 25, 2005

(65) Prior Publication Data
US 2005/0263237 A1    Dec. 1, 2005

(30) Foreign Application Priority Data
May 25, 2004  (JP)  ............................. 2004-155009

(51) Int. Cl.
*B32B 37/00* (2006.01)
(52) U.S. Cl. .................... 156/358; 156/580.2
(58) Field of Classification Search ................ 156/73.1, 156/580, 580.1, 580.2, 581, 583.1, 358, 359
See application file for complete search history.

(56) References Cited

U.S. PATENT DOCUMENTS

| 3,308,225 A | 3/1967 | Wells |
| 3,483,611 A | 12/1969 | Balamuth et al. |

FOREIGN PATENT DOCUMENTS

| DE | 857 868 C | 12/1952 |
| DE | 32 14 694 A1 | 10/1983 |
| EP | 0 421 019 A1 | 4/1991 |
| FR | 2 302 172 A | 9/1976 |
| JP | 57-14488 A | 1/1982 |
| JP | 60-132739 A | 7/1985 |
| JP | 60-155432 A | 8/1985 |
| JP | 2-102012 A | 4/1990 |
| JP | 8-156101 A | 6/1996 |
| JP | 9-320234 A | 12/1997 |
| JP | 2001-297561 A | 10/2001 |
| WO | WO 97/01432 A | 1/1997 |

OTHER PUBLICATIONS

Japanese Abstract No. 01146725, dated Jun. 8, 1989.
Japanese Abstract No. 58197020, dated Nov. 16, 1983.

*Primary Examiner*—James Sells
(74) *Attorney, Agent, or Firm*—Sughrue Mion, PLLC

(57) ABSTRACT

The caulking device for the metal plate for the tape reel of the present invention in which a plurality of bosses 14 formed on one end surface of the tape reel 10 are inserted in a plurality of boss holes 22 formed on the metal plate 20, and the bosses 14 projected from the boss holes 22 are caulked to fix the metal plate 20 to the one end surface of the tape reel 10, wherein the front end surface 3a of the welded horn 3 is formed in a flat state, and is formed in a plane shape capable of simultaneously being brought into contact with all the bosses 14.

8 Claims, 9 Drawing Sheets

CAULKING DEVICE FOR METAL PLATE FOR TAPE REEL

BACKGROUND OF THE INVENTION

1. Field of the Invention

The present invention relates to a caulking device for a metal plate for a tape reel in which the metal plate for the tape reel is fixed to one end surface of the tape reel.

2. Description of the Related Art

As shown in FIG. 8, a conventional tape reel 110 is composed by a disk-like upper flange 111, a cylindrical hub 112 around which a tape is wound, and a lower flange 113 integrally formed with the hub 112 and having the same diameter as that of the upper flange 111 (refer to Patent Reference 1).

The upper flange 111 has, at the central position, a locking portion 111A recessed from the upper surface of the upper flange 111 having the same size as the end surface of the hub 112. Three boss holes 114 are respectively formed away equally from the central position on the locking portion 111A. On the other hand, the three bosses 116 are integrally formed at the positions corresponding to the boss holes 114 on the end surface of the hub 112. When the upper flange 111 and the lower flange 113 are assembled, the boss 115 of the hub 112 is inserted in the boss hole 114 of the upper flange 111, and the front end of the boss 115 projected from the upper surface of the upper flange 111 is welded by an ultrasonic welder 120.

As shown in FIG. 9, the welded horn 121 of the ultrasonic welder 120 used at this time is composed so that the front end surface of the welded horn 121 has a molding portion 125 composed by a hemispherical notch portion 125A and a protrusion 125B whose the central portion is projected. When the boss 115 formed on the hub 112 is caulked to the locking portion 111A of the upper flange 111 by using the welded horn, as shown in FIG. 9, the front end of the boss 115 is formed in the shape of the molding portion 125, and a caulking portion 115A is formed. The caulking portion 115A prevents the upper flange 111 from falling out from the boss 115, and the upper flange 111, a hub 112 and the lower flange 113 are integrated.

Herein, the front end of the welded horn 121 is bit into the locking portion 111A of the upper flange 111 by the braking error of the welded horn 121, and the surface of the locking portion 111A may be curled, and risen. The welded horn 121 described in Patent Reference 1 has a melting guide portion 127 having a tapered outer peripheral end edge of the front end surface, and prevents overflowing resin from flowing in the upper direction of the upper flange 111.

[Patent Reference 1]

Japanese Published Unexamined Patent Application No. H9-320234 (paragraphs 0018, 0019, FIG. 2)

However, in a tape cartridge including such a tape reel 110, a metal plate is fixed to one end surface of the tape reel 110 for chucking the tape reel 110 in a tape drive. In this case, when the metal plate is fixed to one end surface of the tape reel 110 by using the conventional welded horn 121 to caulk the boss 115, a problem exists in that the front end of the welded horn 121 contacts with the surface of the metal plate by the braking error of the welded horn 121, and the metal plate or the welded horn 121 is damaged.

When a molding portion 125 is formed at the front end of the welded horn 121, and the caulking part 115A is formed at the front end of the boss 115, it is necessary to adjust the positions (phases) of the boss 115 and welded horn 121 correctly. That is, after the tape reel 110 is installed at a predetermined position, it is necessary to rotate the tape reel 110 in the axial surrounding direction, and adjust the phases of the boss 115 and welded horn 121. It is considered that a protrusion portion for adjusting the phases is provided on the tape reel 110 so as to adjust the phases correctly and easily, and a recessed portion is formed on the installing base of the tape reel 110. However, since the phase adjusting work itself cannot be omitted, the improvement in working efficiency is limited. A reel feed mechanism to the installing base is complicated at the time of automating the manufacturing process of the tape reel 110, and thereby a reduction in the cost of equipment is hindered.

The present invention has been accomplished so as to solve these problems. It is an object of the present invention to provide a caulking device for a metal plate for a tape reel wherein it is unnecessary to adjust the phases of a boss of the tape reel and welded horn at the time of manufacture (caulking) without bringing a front end surface of the welded horn into contact with the surface of a metal plate.

SUMMARY OF THE INVENTION

According to a first aspect of the present invention, a caulking device for a metal plate for a tape reel, for caulking a plurality of bosses formed on one end surface of a tape reel while being inserted in a plurality of boss holes formed on a metal plate to fix the metal plate to one end surface of the tape reel, comprises:

a part installing portion on which the tape reel is installed in a state where the boss holes of the metal plate are engaged with the bosses;

a welded horn for melting the bosses of the tape reel installed on the part installing portion;

an ultrasonic oscillation portion for vibrating the welded horn;

a driving portion for bringing the welded horn into contact with the bosses and for separating the welded horn from the bosses; and a controlling portion for controlling the ultrasonic oscillation portion and the driving portion, wherein the plurality of bosses is projected from the plurality of boss holes when the bosses are inserted in the boss holes;

the part installing portion can install the tape reel and the metal plate in an optional direction in the axial surrounding direction of the tape reel;

the front end surface of the welded horn is formed in a flat state; and the plane shape of the front end surface of the welded horn is formed in a shape capable of being brought into contact with all the bosses of the tape reel installed on the part installing portion.

According to the construction, the part installing portion can install the tape reel and the metal plate in an optional direction in the axial surrounding direction of the tape reel. The front end surface of the welded horn is formed in a flat state, and the front end surface of the welded horn is formed in the plane shape capable of being brought into contact with all the bosses of the tape reel installed on the part installing portion. Thereby, even when the tape reel and the metal plate are installed in any direction on the part installing portion, the front end surface of the welded horn can be brought into contact with the boss to caulk the boss. That is, when the tape reel and the metal plate are installed on the part installing portion, it is unnecessary to adjust the phases of the tape reel and welded horn.

Herein, for example, the front end surface of the welded horn may be formed so that all the bosses are contained within the projection range when the plane shape of the front end surface is projected on one end surface of the tape reel. The shortest distance between the central point of the welded horn on the front end surface and the outer peripheral end may be larger than the maximum distance between the central point of the tape reel and the outer circumference surface of the boss. The front end surface of the welded horn can be brought into contact with all the bosses of the tape reel installed in an optional direction by such a shape. For example, a circle shape or a doughnut shape can be used as a specific plane shape.

According to a second aspect of the invention, there is provided a caulking device for a metal plate for a tape reel as set forth in the first aspect of the invention, further comprising a reactive force detecting portion for detecting reactive force that the welded horn receives from the bosses at the time of melting the bosses, wherein the controlling portion controls the ultrasonic oscillation portion or the driving portion based on a signal from the reactive force detecting portion to stop the caulking operation.

According to the construction, when the front end surface of the welded horn formed in a flat state is brought into contact with the boss projected from the boss hole, and the boss is melted by vibrating the welded horn using the ultrasonic oscillation portion, the melted boss overflows from the boss hole, and is expanded between the front end surface of the welded horn and the metal plate. When the melted boss is expanded between the front end surface of the welded horn and the metal plate, the contact surface between the front end surface of the welded horn and the boss is increased, and the reactive force that the welded horn receives from the boss is increased. Since the caulking device detects the reactive force using the reactive force detecting means, when the reactive force reaches a predetermined value, the controlling portion controls the ultrasonic oscillation portion or the driving portion to stop the caulking operation, and thereby the welded horn does not contact with the metal plate.

It is preferable that the volume of the boss is larger by 5% to 15% than the capacity of the boss hole.

Effects of the Invention

BRIEF DESCRIPTION OF THE INVENTION

FIG. 1 is a perspective view showing a tape reel and metal plate according to the embodiment.

FIG. 2 is a sectional view showing a boss and a boss hole according to the embodiment, wherein FIG. 2(a) is a sectional view showing a boss and a boss hole before inserting the boss into the boss hole according to the embodiment, FIG. 2(b) is a sectional view showing the boss and boss hole after inserting the boss into the boss hole according to the embodiment, and FIG. 2(c) is a sectional view showing the boss and boss hole at the time of caulking the boss according to the embodiment.

DESCRIPTION OF PREFERRED EMBODIMENTS

Figure 1:
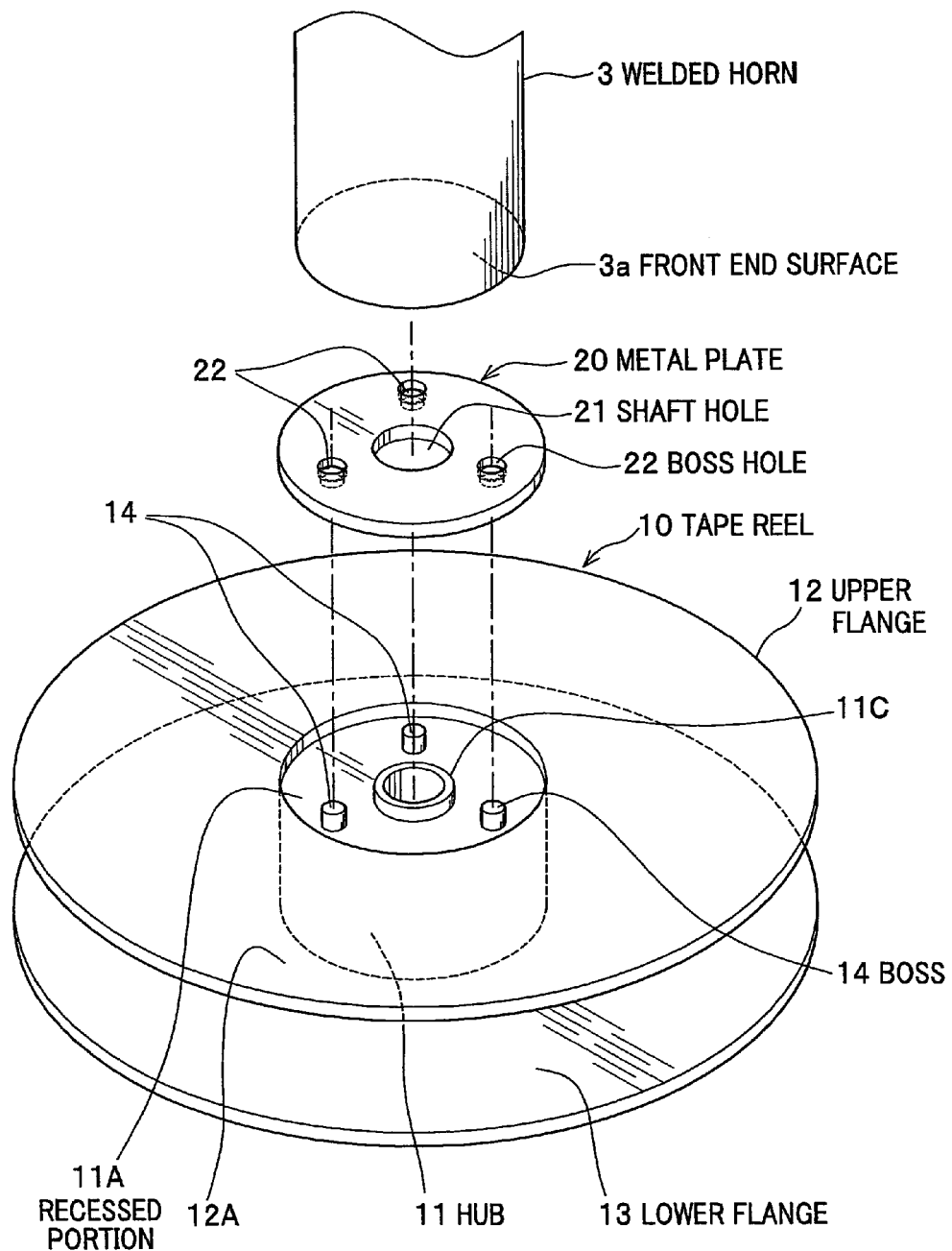
Figure 2A:
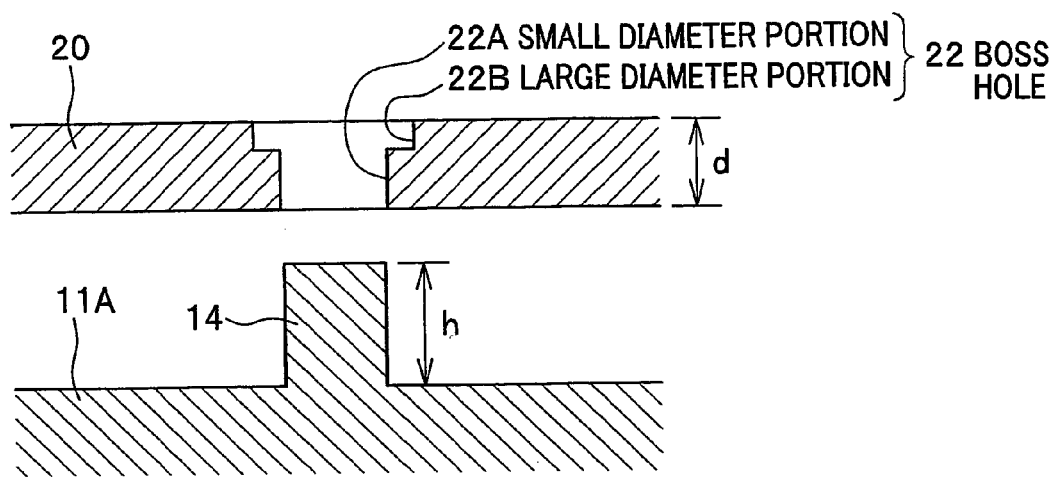
Figure 2B:
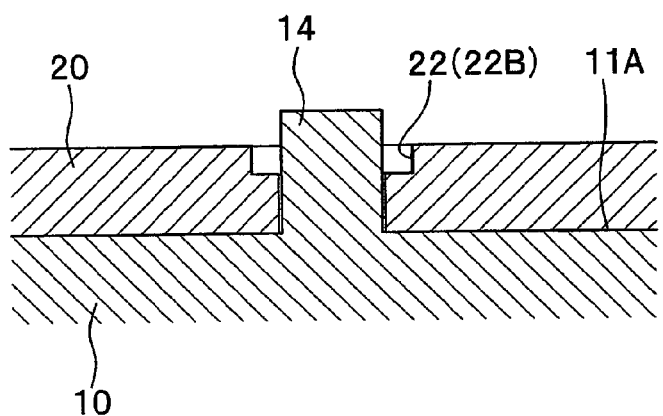
Figure 2C:
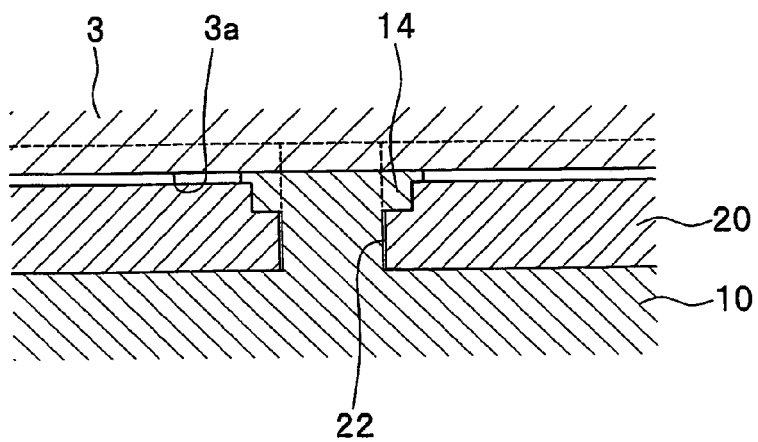
Figure 3:
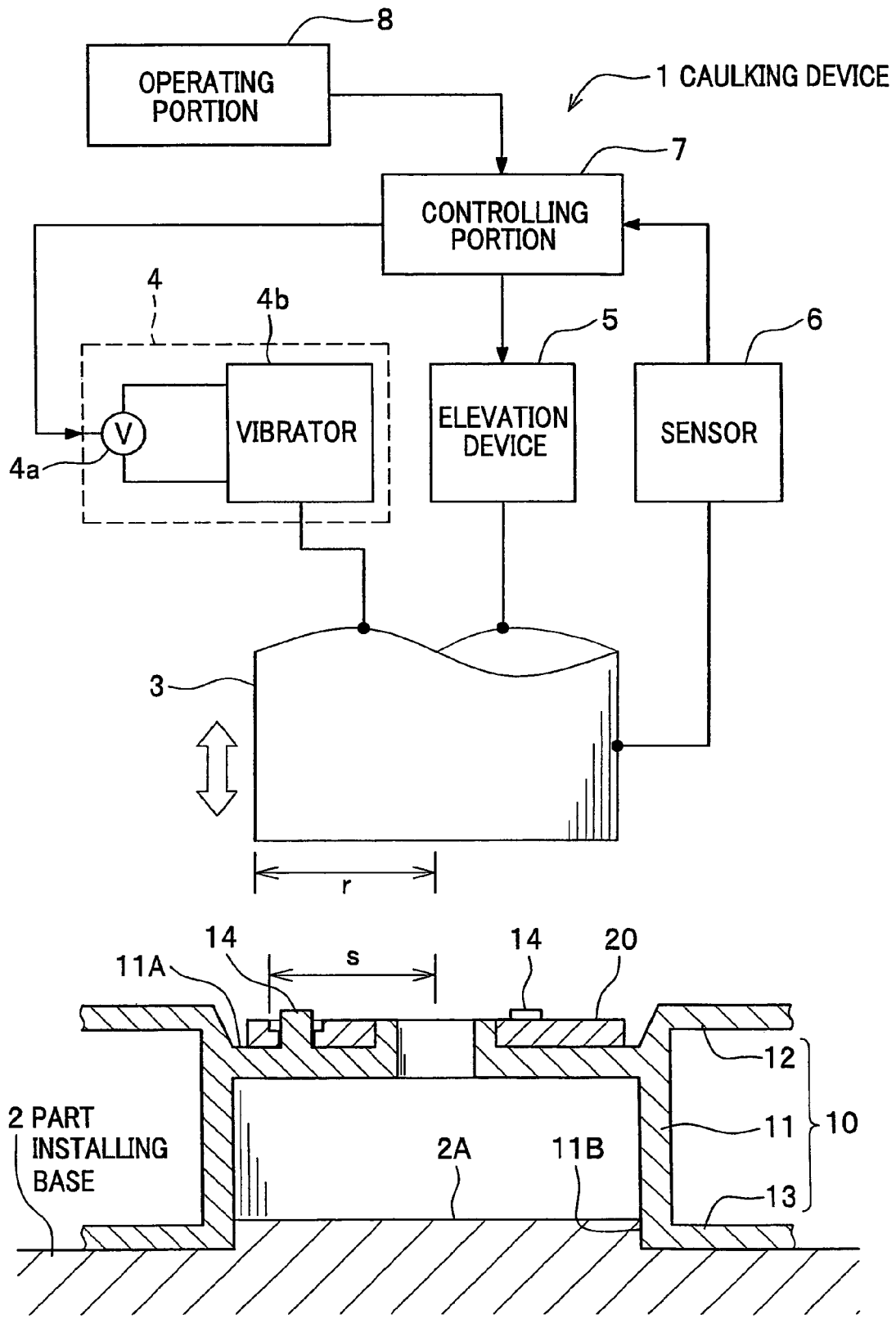
FIG. 3 is a schematic construction view of a caulking device for a metal plate for a tape reel according to the embodiment.

Embodiments of the present invention will be described in detail with reference to the drawings. In the description, identical components are designated by the same reference numerals, and overlappipng description is omitted. FIG. 1 is a perspective view showing a tape reel and metal plate according to the embodiment. FIG. 2 is a sectional view showing a boss and a boss hole according to the embodiment, wherein FIG. 2(a) is a sectional view showing a boss and a boss hole before inserting the boss into the boss hole according to the embodiment, FIG. 2(b) is a sectional view showing the boss and boss hole after inserting the boss into the boss hole according to the embodiment, and FIG. 2(c) is a sectional view showing the boss and boss hole at the time of caulking the boss according to the embodiment. FIG. 3 is a schematic construction view of a caulking device for a metal plate for a tape reel according to the embodiment.

<Tape Reel 10>

A magnetic tape or the like is wound around a tape reel 10. As shown in FIG. 1, the tape reel 10 is composed by a hub 11, an upper flange 12 and a lower flange 13. The tape reel 10 is made of a synthetic resin, and is molded by a method such as injection molding. The axial direction of the hub 11 is set to an upward and downward direction for convenience of description. One end thereof is set to an upper side (upper side in FIG. 1), and the other end is set to a lower side (lower side in FIG. 1).

The magnetic tape is wound around the hub 11, and the hub 11 has a cylindrical shape closed at the upper end. The upper flange 12 and the lower flange 13 guide the magnetic tape to wind the magnetic tape around the hub 11 so as to be aligned. The disk-like upper flange 12 and lower flange 13 have a larger diameter than that of the hub 11, and are extended in an axial direction perpendicular from the upper end surface and lower end surface of the hub 11.

A recessed portion 11A recessed from the upper surface 12A of the upper flange 12 is formed on the upper end surface of the hub 11. A metal plate 20 to be described later is fixed to the recessed portion 11A, and a ring-shaped projection 11C fitted to a shaft hole 21 of the metal plate 20 is projected around a shaft hole formed at the center of the bottom surface of the recessed portion 11A. Three bosses 14, 14 and 14 are projected at equal intervals (120° interval) in an axial surrounding direction at equidistant positions from the axial center of the hub 11 on the bottom surface of the recessed portion 11A. The boss 14 is described in detail later.

<Metal Plate 20>

The disk-like metal plate 20 has a relatively smaller diameter than that of the recessed portion 11A. The thickness d (refer FIG. 2(a)) thereof is smaller than the level difference between the bottom surface of the recessed portion 11A and the upper surface 12A of the upper flange 12. The shaft hole 21 is formed at the center of the metal plate 20, and is fitted to the projection 11C formed on the recessed portion 11A of the hub 11. Three boss holes 22, 22 and 22 are formed at equal intervals (120° interval) in the axial surrounding direction at equidistant positions from the center on the metal plate 20. The distance between the center of the metal plate 20 and the center of the boss hole 22 is equal to the distance between the axial center of the tape reel 10 and the center of the boss 14. Thereby, the metal plate 20 can be installed in the recessed portion 11A while the bosses 14 of the tape reel 10 are inserted in the boss holes 22. The boss hole 22 is described in detail later.

<Boss 14 and Boss Hole 22>

The boss 14 is caulked by a welded horn 3 of a caulking device 1 to be described later, and is engaged with the boss hole 22 of the metal plate 20 in a caulked state. As shown in FIG. 1 and FIG. 2, the boss 14 has a cylindrical shape, and the height h thereof is larger than the thickness d of the metal plate 20. That is, the boss 14 is projected from the boss hole 22 when the boss 14 is inserted in the boss hole 22 of the metal plate 20 (refer to FIG. 2(b)). The size of the boss 14 is adjusted so that the boss 14 overflows (fills) from the boss hole 22 when the boss 14 is caulked (melted) by the welded horn 3 (refer to FIG. 2(C)). In the embodiment, the boss 14 is formed so that the volume of the boss 14.is larger than the capacity of the boss hole 22.

It is preferable that the target of the volume of the boss 14 is set to the increased value of 5% to 15% of the capacity of the boss hole 22. It is preferable that the height of the portion running over the upper surface of the metal plate 20 after caulking the boss 14 is about 0.1 mm to about 0.2 mm.

The boss hole 22 is a through-hole engaged with the boss 14 of the tape reel 10. In the embodiment, as shown in FIG. 1 and FIG. 2(a), the boss hole 22 is composed by a small diameter portion 22A having almost the same diameter as the boss 14 and a large diameter portion 22B expanded rather than the small diameter portion 22A. The metal plate 20 is installed in the recessed portion 11A of the tape reel 10 with the small diameter portion 22A directed to the side of the tape reel 10. A level difference is formed on the continuation portion of the small diameter portion 22A and large diameter portion 22B. The metal plate 20 is fixed to the tape reel 10 by engaging the level difference with the caulked boss 14.

<Caulking Device 1 for a Metal Plate for a Tape Reel>

FIG. 3 is a schematic construction view of a caulking device for a metal plate for a tape reel according to the embodiment. A caulking device 1 for a metal plate for a tape reel (hereinafter referred simply to as "caulking device 1") caulks the boss 14 of the tape reel 10 inserted in the boss hole 22 of the metal plate 20. As shown in FIG. 3, the caulking device 1 comprises a part installing base 2, the welded horn 3, an ultrasonic oscillation portion 4, an elevation device 5, a sensor 6, a controlling portion 7 and an operating portion 8.

The part installing base 2 is a base for installing the tape reel 10 and the metal plate 20. The welded horn 3 is vertically movably installed on the upper part of the part installing base 2. A protrusion portion 2A fitted to an opening 11B formed on the lower surface of the hub 11 of the tape reel 10 and having a flat cylindrical shape is formed on the upper surface of the part installing base 2. The axial center of the welded horn 3 is fit to that of a tape reel 10 by fitting the opening 11B of the hub 11 to the protrusion portion 2A. A projection or the like for adjusting the phases of the boss 14 of the tape reel 10 and welded horn 3 is not provided on the protrusion portion 2A, and the tape reel 10 can be installed in the optional direction in the axial surrounding direction.

The welded horn 3 abuts against and vibrates the boss 14 of the tape reel 10 to generate frictional heat to melt the boss 14. As shown in FIG. 1, the welded horn 3 has a cylindrical shape, and the front end surface 3a (the end surface of the side of the part installing base) is formed in a flat state. As shown in FIG. 3, the radius r of the front end surface 3a of the welded horn 3 is larger than the maximum distance S between the central axis of the metal plate 20 and the inner circumference surface of the boss hole 22. In the embodiment, the welded horn 3 is vertically movably composed in the central axial direction of the welded horn 3 (the central axial direction is fit to operating direction). Thereby, the welded horn 3 can make the front end surface 3a thereof contact with the three bosses 14, 14 and 14 of the tape reel 10 installed on the part installing base 2.

The ultrasonic oscillation portion 4 vibrates the welded horn 3 to melt the boss 14. The ultrasonic oscillation portion 4 is composed by an oscillation part 4a for oscillating ultrasonic waves, and a vibrator 4b vibrated by the ultrasonic waves. The vibrator 4b is connected to the welded horn 3, and can vibrate the welded horn 3 at a prescribed number of vibrations.

The elevation device 5 brings the welded horn 3 into contact with the boss 14 of the tape reel 10 installed on the part installing base 2 and separates the welded horn 3 from the boss 14. For example, the elevation device 5 is composed by combining a known servomotor, gear, and a rack or the like.

The sensor 6 brings the front end surface 3a of the welded horn 3 into contact with the front end of the boss 14, and measures the reactive force that the welded horn 3 receives from the boss 14 at the time of melting the boss 14. The sensor 6 is composed by a known load sensor, and transmits the detected load signal to a controlling portion 7 to be described later. The reactive force that the welded horn 3 receives from the boss 14 becomes larger as the boss 14 is melted and the diameter becomes larger.

The controlling portion 7 controls the ultrasonic oscillation portion 4 and the elevation device 5. The controlling portion 7 generates the vibration having a predetermined frequency in the ultrasonic oscillation portion 4 based on an instruction from the operating portion 8, and operates the elevation device 5. The controlling portion 7 is connected to the sensor 6, and the caulking operation of the boss 14 is stopped based on a pressure signal transmitted from the sensor 6. Specifically, when the pressure signal transmitted from the sensor 6 reaches the reference value inputted previously, the ultrasonic oscillation portion 4 is stopped, or the elevation device 5 is stopped (or elevated).

The operating portion 8 inputs an instruction for operating the caulking device 1. For example, the operating portion 8 is provided with various setting switches for inputting the number of vibrations of the ultrasonic oscillation portion 4, and the reference value of the reactive force at the time of stopping the caulking operation or the like. Herein, it is preferable that the reference value of the reactive force at the time of stopping the caulking operation is determined by performing an examination several times using the caulking device 1. The inputted reference value or the like is stored in a memory (not shown) provided in the controlling portion 7.

<Operation of a Caulking Device 1>

Figure 4:
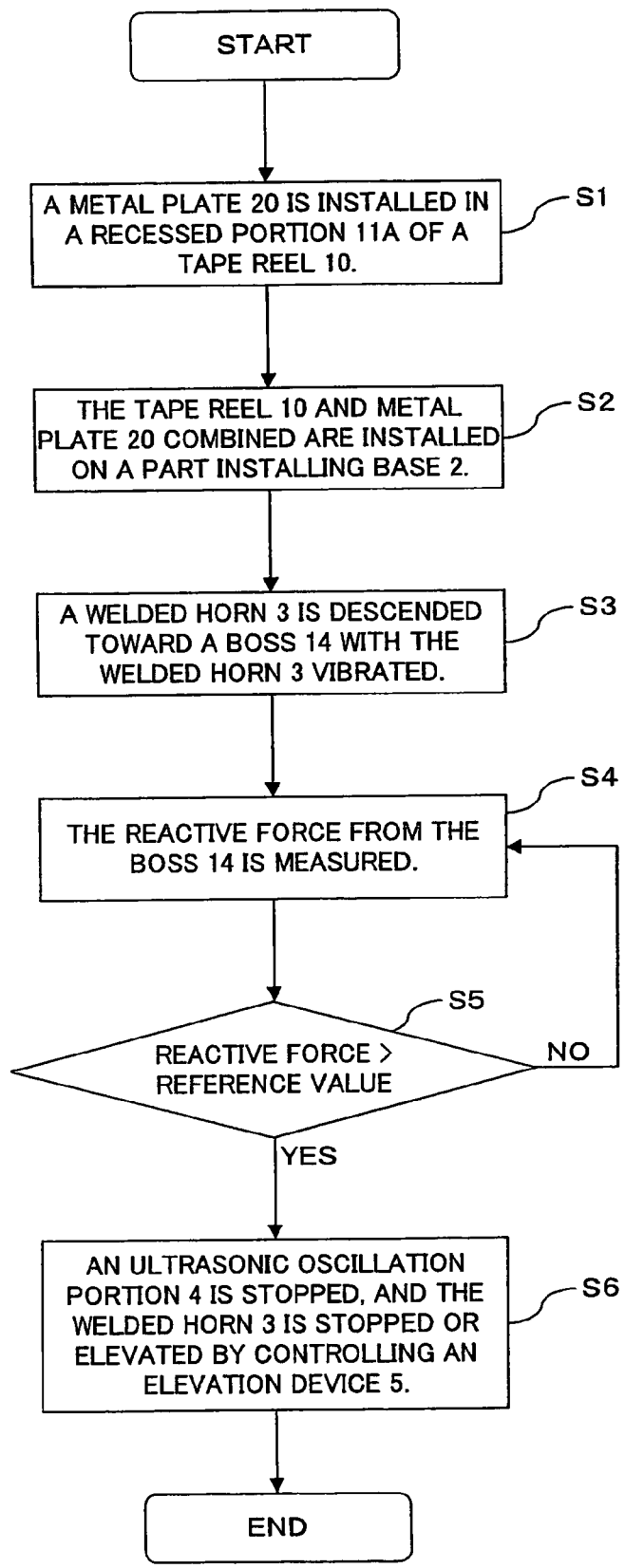
FIG. 4 is a flow chart for explaining the operation of the caulking device for the metal plate for the tape reel according to the embodiment.

Next, the operation of the caulking device 1 is described with reference to a flow chart shown in FIG. 4. First, the bosses 14 of the tape reel 10 are inserted in the boss holes 22 of the metal plate 20 (refer to FIG. 2 (B)), and the metal plate 20 is installed in the recessed portion 11A of the tape reel 10 (step S1).

Next, the tape reel 10 and metal plate 20 combined are installed on the part installing base 2 of the caulking device 1 (step S2). At this time, the opening portion 11B of the hub 11 is fitted to the protrusion portion 2A of the part installing base 2, and the position of the central axis of the tape reel 10 is fit to that of the central axis of the welded horn 3. Since the front end surface 3a of the welded horn 3 has a size and shape so as to be in contact with all the bosses 14 when the welded horn 3 had descended toward the tape reel 10, it is unnecessary to adjust the phases of the boss 14 and the welded horn 3.

When setting of the parts is completed, the caulking device 1 is operated by operating the operating portion 8, and the welded horn 3 is descended toward the boss 14 while the welded horn 3 is vibrated at a prescribed number of vibrations (step S3).

When the front end surface 3a of the welded horn 3 is made into contact with the bosses 14, frictional heat is generated on the surfaces of the bosses 14 by the vibration of the welded horn 3, and the bosses 14 start to be melted. The melted boss 14 is pressed as the welded horn 3 approaches the metal plate 20, and starts to be expanded along the large diameter portion 22B of the boss hole 22. When the large diameter portion 22B is filled with the melted boss 14, a part of the melted boss 14 which has not been settled in the large diameter portion 22B is expanded in a thin disk shape between the front end surface 3a of the welded horn 3 and the upper surface of the metal plate 20.

When the boss 14 is pressedly crushed, the diameter of the boss 14 is gradually enlarged, and the reactive force to the front end surface 3a of the welded horn 3 is gradually enlarged. At this time, the sensor 6 measures the reactive force from the boss 14, and transmits the measured reactive force as a signal to the controlling portion 7 (step S4).

The controlling portion 7 compares the reference value previously inputted with the reactive force transmitted from the sensor 6 (step S5). The caulking operation is continued when the reactive force transmitted from the sensor 6 is smaller than the reference value (step S5, No). The caulking operation is ended when the reactive force is larger than the reference value (step S5, Yes). Specifically, the ultrasonic oscillation portion 4 is stopped, and the welded horn is stopped or elevated by controlling the elevation device 5 (step S6.).

As described above, the caulking device 1 according to the embodiment can prevent the front end of the welded horn 3 from contacting the surface of the metal plate 20, and it is unnecessary to adjust the phases of the boss 14 of the tape reel 10 and welded horn 3. Thereby, the manufacturing efficiency can be improved, and the automation of the manufacturing process of the tape reel 10 can be promoted.

OTHER EMBODIMENT

The structure of a tape reel as a caulked object of the caulking device 1 is not limited to the structure of the tape reel 10 shown in FIG. 1, and may have the following structure.

Figure 5A:
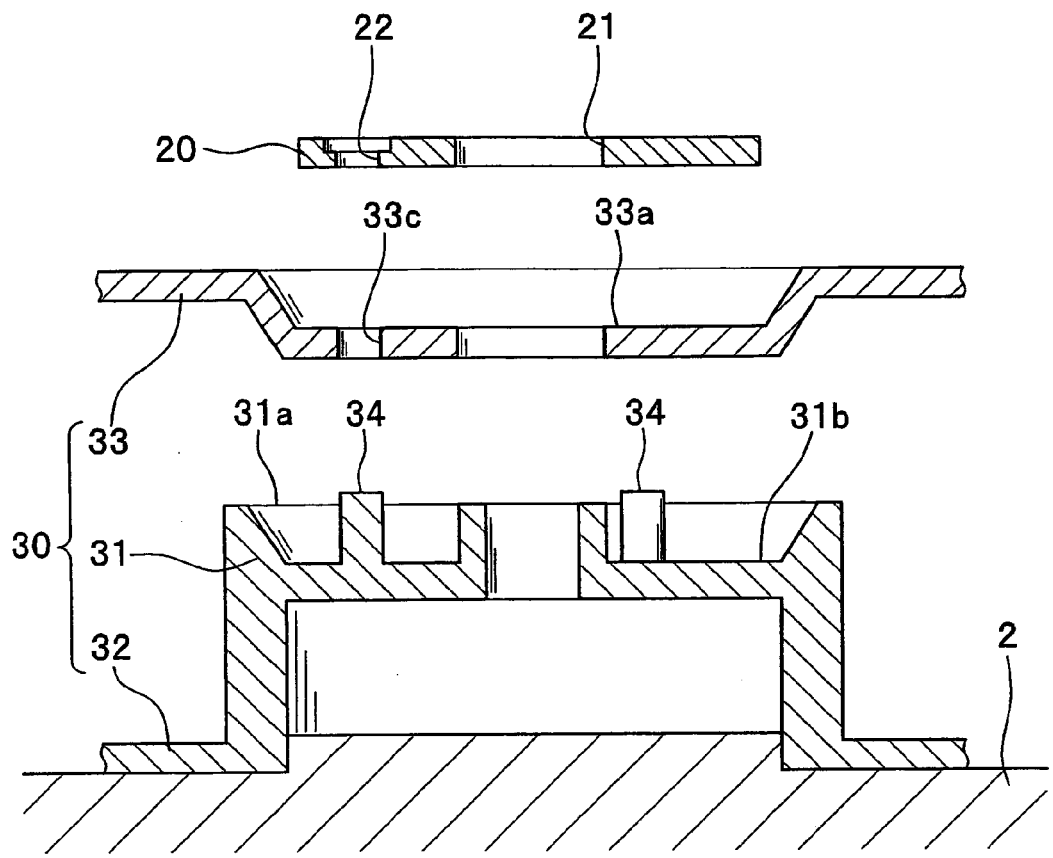
FIGS. 5A-5B are sectional views of a tape reel and metal plate according to another embodiment.

FIG. 5 is a sectional view of a tape reel according to another embodiment.

The tape reel 30 shown in FIG. 5 is different from the tape reel 10 according to the embodiment in the structure that a hub 31 and an upper flange 33 are separately formed. That is, the tape reel 30 is composed by a cylindrical hub 31, a disk-like lower flange 32 integrally formed with the lower end edge of the hub 31 and extended in the axial direction perpendicular to the hub 31, and a disk-like upper flange 33 separately formed from the hub 31.

A recessed portion 31b is formed on an upper end surface 31a of the hub 31. Three bosses 34, 34 and 34 are projected at equal intervals in the axial surrounding direction at equidistant positions from the axial center of the hub 31 on the bottom surface of the recessed portion 31b. The disk-like upper flange 33 has almost the same diameter as that of the lower flange 32, and a depressed portion 33a depressed in a shape fitted to the recessed portion 31b of the hub 31 to the upper surface of the upper flange 33 is formed at the central part of the upper flange 33. A boss hole 33c is bored at the position corresponding to the boss 34 on a depressed portion 33b.

Figure 5B:
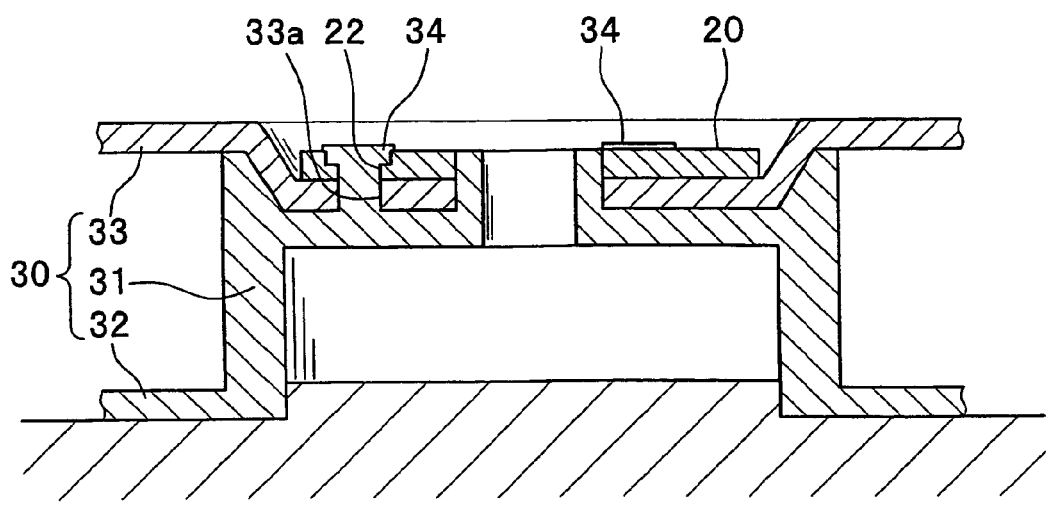

When the hub 31, the upper flange 33 and the metal plate 20 are combined, as shown in FIG. 5(b), the upper flange 33 is held between the hub 31 and the metal plate 20. Herein, the boss 34 projected on the hub 31 is passed through the boss hole 33c of the upper flange 33 and the boss hole 22 of the metal plate 20, and is projected from the upper surface of the metal plate 20. The boss 34 projected from the upper surface of the metal plate 20 is caulked by the caulking device 1 to integrate the metal plate 20 and tape reel 30.

Figure 6A:
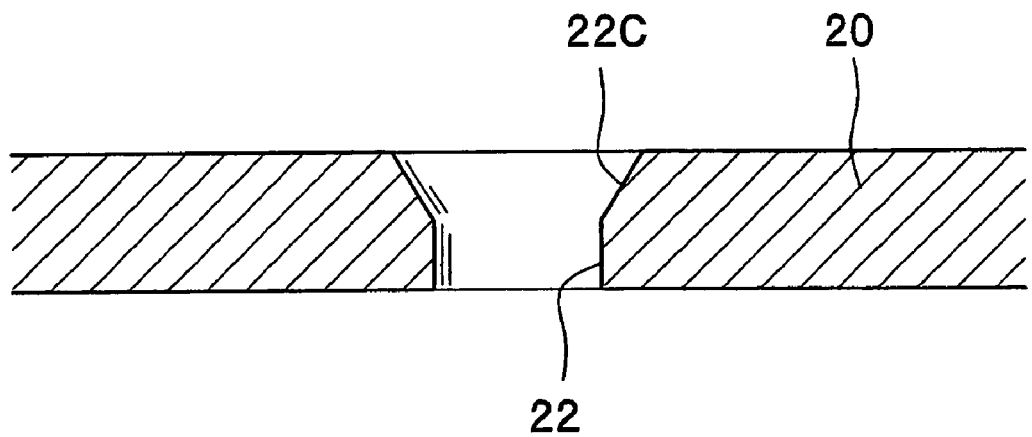
FIGS. 6A-6B are sectional views of a boss hole of the metal plate according to another embodiment.

FIG. 6 is a sectional view of a boss hole of the metal plate according to another embodiment. The boss hole 22 of the metal plate 20 is not limited to one having the shape shown in FIG. 2. For example, as shown in FIG. 6(a), the upper opening part 22c of the boss hole 22 may be formed in a tapered shape. Thereby, the melted boss 14 is deformed along the upper opening part 22C formed in the tapered shape, and the metal plate 20 can be caulked.

Figure 6B:
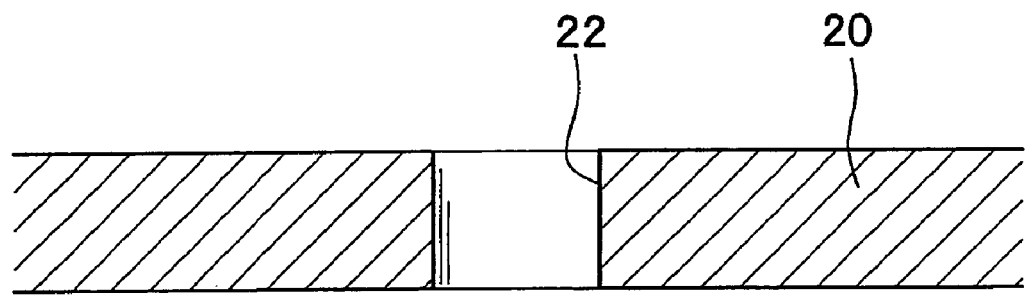

When the thickness of the portion overflowing onto the upper surface of the metal plate 20 can be enlarged to a degree which can prevent the metal plate 20 from dropping off, as shown in FIG. 6(b), the whole may have almost the same diameter as the diameter of the boss 14 without changing the inner diameter of the boss hole 22.

Figure 7:
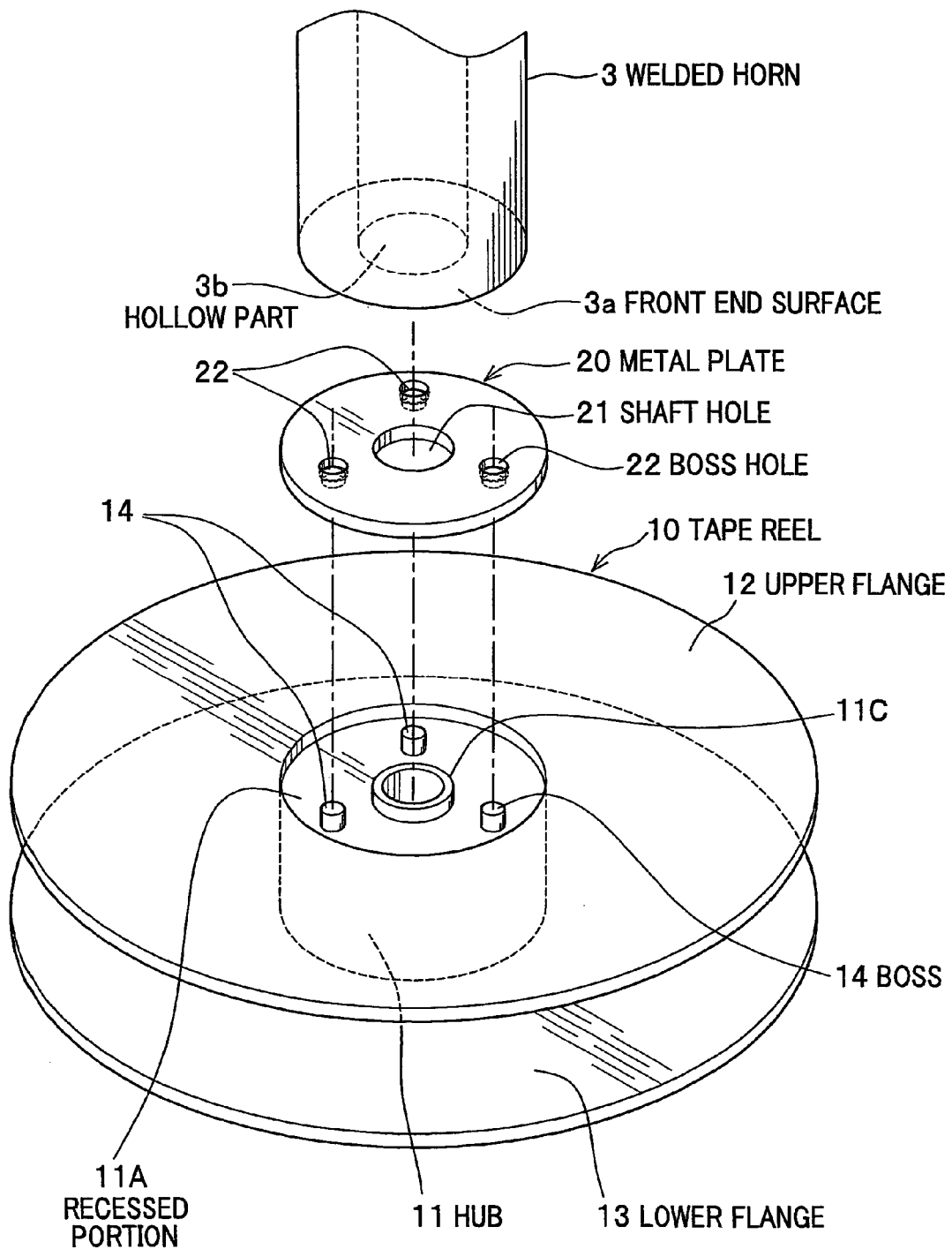
FIG. 7 is a perspective view showing a welded horn according to another embodiment.
Figure 8:
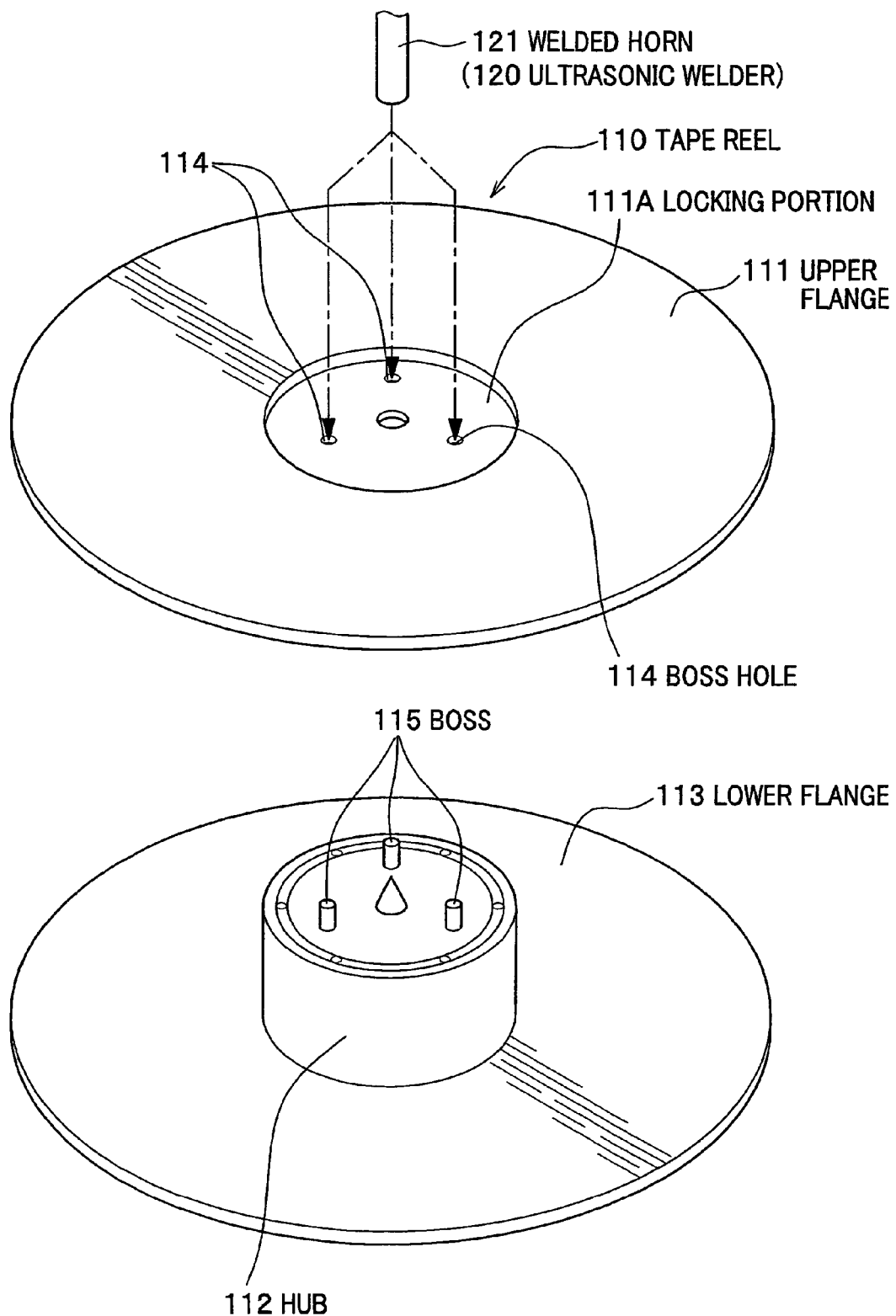
FIG. 8 is a perspective view showing the structure of a conventional tape reel.
Figure 9:
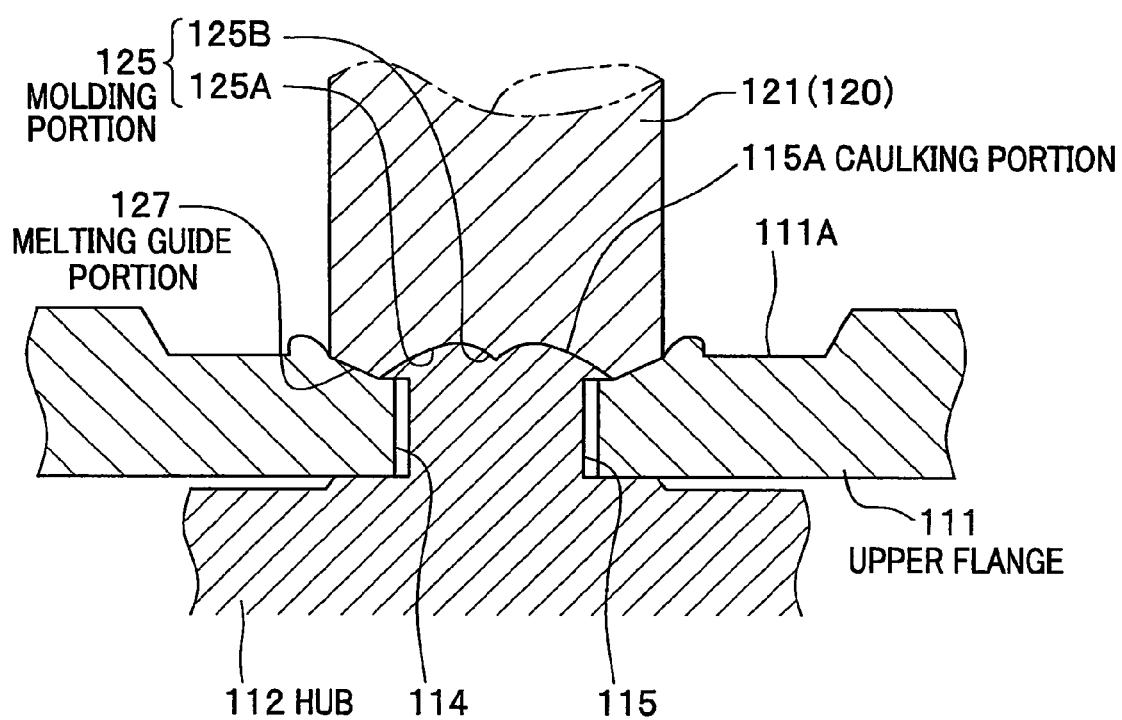
FIG. 9 is a sectional view showing a boss and welded horn of a conventional tape reel.

FIG. 7 is a perspective view showing a welded horn according to another embodiment.

As shown in FIG. 7, a cylindrical welded horn 3 according to another embodiment has a central part having a hollow part 3b, and the front end surface 3a is formed in a doughnut shape. The distance between the axial center of the welded horn 3 and the inner circumference surface of the hollow part 3b is smaller than the shortest distance between the axial center of the metal plate 20 and the inner circumference surface of the boss hole 22.

The distance between the axial center of the welded horn 3 and the outer circumference surface is larger than the maximum distance between the axial center of the metal plate 20 and the inner circumference surface of the boss hole 22 in the same manner as the welded horn 3 shown in FIG. 2.

The front end surface 3a of the welded horn 3 can be brought into contact with all the bosses 14 (34) at once by setting the shape of the front end surface 3a of the welded horn 3 to such a size.

As described above, although the preferred embodiments of the present invention have been described in detail with reference to the drawings, the present invention is not limited to the above embodiments. Design variations can be suitably performed without departing from the spirit of the present invention.

For example, although the both end surfaces of the hub 11 of the tape reel 10 are respectively provided with the upper flange 12 and the lower flange 13, and the flanges may be omitted when the flanges are not required. In this case, the tape reel 10 is composed by only the hub 11, the metal plate 20 is attached to one end surface of the hub 11.

The plane shape of the front end surface 3a of the welded horn 3 is not limited to the circle shape and doughnut shape shown as the embodiments. The welded horn 3 may have any shape as long as the welded horn 3 can be brought into contact with all the bosses simultaneously formed on the one end surface of the tape reel.

In the embodiment, although the operating direction of the welded horn 3 is fit to the central axial direction of the welded horn 3, the operating direction is not limited thereto. The welded horn 3 may be moved in any direction as long as the boss 14 can be caulked.

According to the present invention, when the tape reel and the metal plate are caulked, it is unnecessary to rotate the tape reel in the axial surrounding direction to adjust the phases of the boss and welded horn. Thereby, the caulking work of the tape reel and metal plate can be simplified, and the efficiency can be enhanced.

Since it is unnecessary to provide a protrusion portion and a recessed portion or the like for adjusting the phases on the part installing portion and the tape reel, the structure of the caulking device for the metal plate for the tape reel can be simplified. The structure of a reel feed mechanism can be simplified when the manufacturing process of the tape reel is automated.

Further, according to the present invention, since the tape reel does not contact with the metal plate, damage of the metal plate or welded horn can be prevented. Thereby, generation of nonconforming products can be prevented, and the productivity of the tape reel can be further improved.

What is claimed is:

1. A caulking system comprising:
tape reel having a plurality of bosses formed on one end surface thereof;
a metal plate having a plurality of boss holes formed therein, wherein each of the plurality of bosses are formed to be inserted into a respective one of the plurality of boss holes; and
a caulking device operative to caulk the plurality of bosses onto the metal plate to fix the metal plate to the one end surface of the tape reel,
the caulking device comprising:
a part installing portion on which the tape reel is installed in a state where the plurality of boss holes of the metal plate are engaged with the plurality of bosses;
a welded horn for melting the plurality of bosses of the tape reel installed on the part installing portion;
an ultrasonic oscillation portion for vibrating the welded horn;
a driving portion for bringing the welded horn into contact with the plurality of bosses and for separating the welded horn from the plurality of bosses; and
a controlling portion for controlling the ultrasonic oscillation portion and the driving portion,
wherein the plurality of bosses project from the plurality of boss holes when the plurality of bosses are inserted in the plurality of boss holes;
the part installing portion can install the tape reel and the metal plate in an optional direction in the axial surrounding direction of the tape reel;
the front end surface of the welded horn is formed in a flat state; and
the plane shape of the front end surface of the welded horn is formed in a shape capable of being brought into contact with all of the plurality of bosses of the tape reel installed on the part installing portion,
wherein each of the plurality of bosses are formed so that a volume of each respective boss is larger than a capacity of a corresponding boss hole.

2. The caulking system according to claim 1, wherein the caulking device further comprises a reactive force detecting portion for detecting a reactive force that the welded horn receives from the plurality of bosses at the time of melting the plurality of bosses, wherein the controlling portion controls the ultrasonic oscillation portion or the driving portion based on a signal from the reactive force detecting portion to stop the caulking operation.

3. The caulking system according to claim 1, wherein each respective boss is set to the increased value of 5% to 15% of the capacity of each corresponding boss hole.

4. The caulking system according to claim 1, wherein a height of a portion running over an upper surface of the metal plate after caulking a respective boss is about 0.1 mm to about 0.2 mm.

5. The caulking system according to claim 1, wherein the ultrasonic oscillation portion is composed by an oscillation part for oscillating ultrasonic waves, and a vibrator vibrated by the ultrasonic waves, whereby the vibrator is connected to the welded horn, and can vibrate the welded horn at a prescribed number of vibrations.

6. The caulking system according to claim 5, wherein the front end surface of the welded horn is a circle shape or a doughnut shape.

7. The caulking system according to claim 1, wherein said tape reel comprises a hub and an upper flange unified or separately formed with each other.

8. The caulking system according to claim 1, wherein an upper opening part of each of the plurality of boss holes is formed in a tapered shape.

* * * * *